United States Patent [19]

Hauschild et al.

[11] Patent Number: 4,774,280
[45] Date of Patent: Sep. 27, 1988

[54] POLYETHYLENE BASED RESINS, THEIR PREPARATION, AND THEIR APPLICATION AS BINDING AGENTS IN COATINGS

[75] Inventors: Rémi Hauschild, Paris; Jean Aubry; Adrien Nicco, both of Bethune, all of France

[73] Assignee: Norsolor, Paris la Defense, France

[21] Appl. No.: 41,268

[22] Filed: Apr. 22, 1987

[30] Foreign Application Priority Data

Apr. 22, 1986 [FR] France ................. 86 05779

[51] Int. Cl.$^4$ ................. C08F 255/02; C08F 291/18; C09D 3/73; C09J 3/14
[52] U.S. Cl. ................. 524/533; 523/344; 524/504; 525/293; 525/301; 525/303; 525/309; 525/324
[58] Field of Search ............. 525/293, 301, 303, 309, 525/324; 524/533, 504; 523/344

[56] References Cited

U.S. PATENT DOCUMENTS

| | | |
|---|---|---|
| 3,342,900 | 9/1967 | Marans . |
| 3,859,385 | 1/1975 | Mainord ................. 525/301 |
| 3,883,458 | 5/1975 | Mueller et al. ................. 525/301 |
| 3,983,186 | 9/1976 | Eilers et al. ................. 525/197 |
| 4,028,436 | 6/1977 | Bogan et al. ................. 525/301 |
| 4,043,959 | 8/1977 | Frye ................. 524/518 |
| 4,338,230 | 7/1982 | Ames ................. 525/301 |
| 4,358,564 | 11/1982 | Ames ................. 525/301 |
| 4,443,584 | 4/1984 | Michel . |
| 4,459,388 | 7/1984 | Hettche et al. ................. 525/387 |
| 4,565,644 | 1/1986 | Smith et al. ................. 521/110 |

FOREIGN PATENT DOCUMENTS

| | | |
|---|---|---|
| 562661 | 5/1958 | Belgium . |
| 1177898 | 4/1959 | France . |
| 1132894 | 11/1968 | United Kingdom . |

Primary Examiner—Herbert J. Lilling
Attorney, Agent, or Firm—Millen & White

[57] ABSTRACT

New resins based on oxidized polyethylene, which are thermoplastic or thermosetting, soluble in solvents and/or aqueous media, are characterized in that they consist essentially of grafted polyethylene obtained by preparing a dispersion of a molten oxidized polyethylene in an organic solvent medium at a temperature above the softening range of the oxidized polyethylene. The oxidized polyethylene is employed in a proportion of 0.5 to 30% by weight of the resin and has a weight average molecular weight of between 900 and 25,000 and also contains side groups ending in functional groups capable of giving rise to free radicals. The dispersion is polymerized with a mixture of catalyzed monomers consisting essentially of acrylic and/or methacrylic monomers, in a proportion of 70 to 99.5% by weight based on the resin, the mixture being added gradually during the reaction.

The resins according to the invention can be employed as a binder for coatings in paints, varnishes, glues, inks, adhesives and sealants.

30 Claims, No Drawings

POLYETHYLENE BASED RESINS, THEIR PREPARATION, AND THEIR APPLICATION AS BINDING AGENTS IN COATINGS

The present invention relates to new resins based on oxidized polyethylene which are, depending on circumstances, thermoplastic or thermosetting, soluble in organic solvents and/or aqueous media, and to their application as a binder for a coating, especially in paints, varnishes, inks, glues, adhesives and sealants.

Various classes of polymers based on polyethylene are known. Among these there are known polyethylene-based graft polymers, which exhibit the physical and chemical characteristics and the properties of the original polyethylene. Thus, like the original polyethylene, grafted polyethylenes are insoluble in organic solvents such as alcohols, esters, ethers or ketones and are insoluble in aqueous media.

Various processes for preparing these grafted polyethylenes are known at present.

According to French Pat. No. 1,130,100 and U.S. Pat. No. 2,987,501, sheets, granules or powders of polyethylene of high molecular weight are subjected to an oxidation operation, for example by means of an ionizing radiation and oxygen. Grafting of the oxidized polyethylene produced in this manner is then performed by placing the latter in contact with a mixture of catalyzed monomers, for example by calendering, or alternatively with the application of heat by subjecting the oxidized polyethylene which is in the form of sheets or powders to a solution of catalyzed monomers.

British Pat. No. 1,132,894 describes modified polyethylene waxes obtained by reaction of oxidized polyethylene with ethylenically unsaturated compounds containing a terminal double bond, oxygen atoms, carboxyl or sulphonic groups and by then reacting the product obtained with organic compounds containing basic nitrogen and/or metal salts.

These modified polyethylene waxes are employed as additives in polyolefins, improving their dyeability.

Similarly, Patent DE No. 1,908,620 outlines the preparation of a thermoplastic resin capable of being moulded and drawn, intended to improve the coloring and the application of polyolefins, starting from oxidized polyethylene and vinyl monomers.

The abovementioned methods of preparation result, concurrently with the formation of grafted polyethylene, in the formation of a large quantity of homopolymers based on the monomer or monomers employed. On this subject, there may be mentioned USSR Pat. No. 715,585, which outlines a process for the preparation of emulsifiable modified polyethylene prepared from oxidized polyethylene and acrylic acid. In fact, the product obtained contains homopolymers based on acrylic acid, as well as unreacted oxidized polyethylene.

According to French Pat. No. 1,177,898, it is known to prepare grafted polymers by placing an unsaturated polymer in contact with ozone and then reacting the ozonized polymer obtained with a grafting monomer capable of being polymerized by free radicals. In the case where the grafting monomer is a solvent for the polymer, the monomer may be diluted with an inert product which is not a solvent for the polymer, in order to prevent the latter from dissolving. After reaction, the grafted polymer is separated from the unreacted monomers. According to this process, modified grafted polymers are obtained, which are, like the base polymers, in the form of films or filaments, but which have modified characteristics and properties. Similarly, Belgian Pat. No. 562,661 describes a process for the preparation of grafted copolymers, according to which a polymer is ozonized and then the ozonized polymer is reacted with a monomer capable of being polymerized by a radical mechanism. This process is employed for the surface treatment of articles such as films, powders, tubing and any miscellaneous articles produced by moulding or other processes of manufacture.

The abovementioned processes make it possible to prepare only modified polyethylenes, that is to say that these possess chemical and physical characteristics which are closely related to the original polyethylene.

The subject of the present invention is new resins based on oxidized polyethylene having chemical and physical characteristics which are varied and different from those of the original polyethylene, namely thermoplastic or thermosetting resins, which are soluble in organic solvents and/or in aqueous media.

More precisely, the subject of the invention is thermoplastics or thermosetting resins, soluble in organic solvents and/or aqueous media, characterized in that they consist of grafted polyethylene and in that they are capable of being obtained by:

(a) dispersion of at least one oxidized polyethylene (1) in powder or granule form, in at least one organic solvent (3) which has a boiling point above the softening range of the oxidized polyethylene (1), the said oxidized polyethylene (1) being employed in a proportion of 0.5 to 30% by weight based on the resin prepared and having a weight average molecular weight of between 900 and 25,000 and containing side groups ending in functional groups such as hydroxyl, ketone, carboxyl and/or ester groups capable of giving rise to free radicals, (b) heating, with stirring, the dispersion obtained in this manner to a temperature above the softening temperature of the oxidized polyethylene (1), (c) then, gradual addition of a mixture of catalyzed monomers (2) consisting of acrylic and/or methacrylic monomers and, where appropriate, other ethylenic monomers, in a proportion of 70 to 99.5% by weight based on the resin prepared, to the homogeneous phase of solvent and molten oxidized polyethylene (1) until the resin is obtained.

For the sake of simplicity, in the following text "oxidized polyethylene (1)" will denote polyethylene such as mentioned above which contains the said side groups, and "polyethylene" the polyethylene before its treatment leading to the formation of the side groups originating in the formation of free radicals.

The formation of such side groups is produced by conventional reactions of advanced oxidation of polyethylene, namely under pressure, at high temperatures and in the presence of an oxidizing medium. Thus, molten polyethylene may be reacted with oxygen at a temperature of between and 250° C. under pressure (see U.S. Pat. No. 3,160,621). Alternatively, powdered polyethylene may be subjected to oxygen at a temperature between 100° C. and the melting point of the polyethylene (see GB Pat. No. 971,998). The oxidation may be accelerated by the use of ultraviolet radiation. Polyethylene may also be oxidized using ozone or irradiated in the presence of air or oxygen or, yet again, subjected to a milling operation in the presence of air and hydrogen peroxide.

These oxidation treatments lead in succession to the scission of the polyethylene chains due to the rupture of -C-C- or C-H bonds, formation of hydroperoxides, dissociation into free radicals, degradation via a branching mechanism and the additional oxidation of the aldehyde and ketone groups, leading to products containing hydroxyl, ketone, carboxyl and ester groups. Oxidized polyethylene produced in this manner is stable.

Oxidized polyethylenes (1) which are particularly suitable for the present invention are emulsifiable oxidized polyethylenes whose weight average molecular weight may lie between 900 and 25,000, and preferably between 1,200 and 8,000.

Preferably, during the stages (b) and (c), a reaction temperature is provided which is approximately 5 to 15° C. higher than the softening temperature of the oxidized polyethylene (1), for ease of implementation.

Also preferably, the temperature is kept constant during stage (c). This latter temperature may be that chosen in step (b).

The period during which the mixture of catalyzed monomers (2) is poured into the homogeneous phase of solvent and molten oxidized polyethylene (1) may vary according to the degree of graft modification of the oxidized polyethylene (1) and the nature of the monomers chosen, for example between 1 and 4 hours.

As the polymerization reaction progresses, it is observed that the oxidized polyethylene (1), initially insoluble in the chosen solvent, dissolves until, when the reaction is finished, a clear solution is obtained. In fact, the polymerization reaction according to the invention permits substantial (meth)acrylic chains to be formed on the oxidized polyethylene (1) by initiation of polymerization on the free radicals formed on the polyethylene chain under the effect of temperature and of the catalyst(s), followed by chain propagation.

In contrast to known processes, the invention does not involve the formation of homopolymers. The resins obtained in accordance with the invention can be diluted in organic solvents and/or aqueous media and form clear solutions, without traces of turbidity due to the presence of homopolymers.

Among the monomers (2) which are perfectly suitable for the formation of side chains on the oxidized polyethylene (1), there may be mentioned methacrylic and acrylic monomers such as (meth)acrylic acid, (meth)acrylic esters, for example methyl (meth)acrylate, ethyl (meth)acrylate, butyl (meth)acrylate, 2-ethylhexyl (meth)acrylate, and hydroxylated (meth)acrylic monomers such as 2-hydroxyethyl (meth)acrylate and 2-hydroxypropyl (meth)acrylate, and (meth)acrylic monomers containing amino groups, such as N,N-dimethylaminoethyl (meth)acrylate and N,N-diethylaminoethyl (meth)acrylate. Other ethylenic monomers which can be used for the preparation of the resin according to the invention are, for example, styrenic monomers such as styrene and methylstyrenes, and vinyl monomers such as vinyl acetate.

Among the solvents (3) which can be used in the invention, there may be mentioned glycols such as ethylene glycol and propylene glycol, esters such as ethylglycol acetate, ethers such as butylglycol, higher alcohols such as n-butanol or benzyl alcohol or, yet again, aromatic solvents such as xylene or toluene. It is also possible to use as a solvent high boiling point organic compounds or organic compounds which are solid at ambient temperature. These compounds also need to be inert towards the reaction mixture and must have a low viscosity at the reaction temperature. It may, in fact, be especially advantageous to use as a solvent a compound whose volatility is low at ambient temperature and which has particular properties from which the resins according to the invention will benefit. In this latter category of solvent there may be mentioned plasticizers such as phthalates, adipates and citrates, oxyethylenated derivatives such as oxyethylenated lauryl alcohol, nonylphenol containing, on average, 10 molecules of ethylene oxide (NP 10 for short), nonylphenol containing, on average, 30 molecules of ethylene oxide (NP 30 for short) or nonylphenol containing, on average, 100 molecules of ethylene oxide (NP 100 for short), and trialkyl phosphates such as trimethyl phosphate, triethyl phosphate and tributoxyethyl phosphate, which impart an outstanding heat resistance to the formulated resin. It is also obviously possible to use a combination of two or more of the abovementioned solvents in the process according to the invention.

Among the polymerization catalysts which can be employed in the process according to the invention, there may be mentioned peroxides such as benzoyl peroxide, ditert-butyl oxide or lauroyl peroxide, perbenzoates such as tert-butyl perbenzoate, hydroperoxides such as cumene hydroperoxide, and diazo compounds such as 2,2'-azobis(isobutyronitrile) and 2,2'-azobis(2-methylbutyronitrile). In general, 1 to 4% by weight of catalyst, based on the weight of the monomers (2), is used in the process according to the invention.

The resins according to the invention are advantageous in more than one way.

Firstly, the resins according to the invention constitute a new diversified range of resins based on oxidized polyethylene, which are soluble in common solvents such as alcohols, esters, ethers or ketones, or which are also capable of being diluted with water, and which may be obtained by a process which is simple to implement.

Moreover, their qualities makes them into excellent binders for coating.

Consequently, a second subject of the present invention is binders for coatings such as paints, varnishes, inks, glues, adhesives and sealants, based on thermoplastic or thermosetting resins, soluble in organic solvents and/or aqueous media, characterized in that these resins consist of grafted polyethylene obtained from:

0.5 to 30% by weight of oxidized polyethylene (1), based on the said resins, the said oxidized polyethylene (1) having a weight average molecular weight of between 900 and 25,000 and containing side groups ending in functional groups such as hydroxyl, ketone, carboxyl and/or ester groups, capable of giving rise to free radicals, and 70 to 99.5% by weight of monomers (2) consisting of acrylic and/or methacrylic monomers and, where appropriate, other ethylenic monomers.

Preferably, emulsifiable oxidized polyethylenes (1) which have a weight average molecular weight of between 1,200 and 8,000 are employed.

Thus, solutions of resins according to the invention, containing from 20 to 60% by weight of the said resins, with viscosities of 1 to 50 poises at ambient temperature, may be prepared. The resins according to the invention, obtained from approximately 15 to 30% of oxidized polyethylene (1) and prepared in solvents of the plasticizer type, with low vapor pressures at reaction temperature, can be used, owing to their rheological properties, as a binder in adhesives and sealants. The binders according to the invention are resistant to fatty materials and to yellowing. They also have the advantage that, on drying, they exhibit no solvent retention phenomena. For this reason, the drying of the binders according to the invention, after their application, may be performed at rates which are higher than those employed for drying conventional binders. For example, in the field of inks, the substrates onto which the formulations based on resins according to the invention are applied may run at speeds of the order to 150 m/minute or more in the drying device (drying rack, hot air ventilation), instead of the speeds of 80 to 120 m/minute which are generally employed. In addition, their solvent-retention characteristics are low or even negligible, when drying. Furthermore, the surface characteristics of the coatings produced are excellent: the film is smooth, in fact, and has perfect gloss. In sterilization operations (heat-crosslinkable systems), coatings based on resins according to the invention are found to behave well; no coating separation is observed.

The examples which follow, given by way of guidance, will enable the invention to be better understood.

In these various examples, the quantities of materials are given in parts by weight, and the percentages are in % by weight.

EXAMPLE 1

Into a reactor fitted with a stirring device are introduced 242 parts of ethylglycol and 80 parts of an oxidized polyethylene with the trade name A-C Polyethylene 629, marketed by Allied Chemical. Its characteristics are as follows:
weight average molecular weight: 1750
relative density: 0.93
acid value: 15
softening point (°C.): 104
viscosity at 140° C. (cP): 200

The temperature is then raised to 125° C. and the reaction mixture is kept stirred for 15 minutes. A homogeneous dispersion of oxidized polyethylene in ethylglycol is then obtained.

The following mixture is then introduced continuously into the homogeneous dispersion, over three hours:
styrene: 265
butyl acrylate: 331
methacrylic acid: 65
ditert-butyl peroxide: 16

During this addition, the temperature is raised and kept at 130° C.

The reaction is then allowed to continue for 1 h 30 min.

At the end of the reaction, the hot reaction mixture has the appearance of a transparent solution with bluish reflections. The viscosity of this solution is 15 poises. After cooling, a "rubbery" and very slightly sticky opaque mass is obtained.

The product obtained has the following characteristics:
solids content (in %): 76
acid value: 54
quantity of polyethylene in the solids content (in %): 10.3

This product is soluble in ethyl acetate, methyl acetate, ethylglycol and butylglycol. On the other hand, it is insoluble in ethanol.

APPLICATIONS OF THE SOLUTION CONTAINING 76% OF SOLIDS, PREPARED ABOVE (1) The solution obtained previously is diluted with ethyl acetate so as to prepare a solution containing 50% solids. This latter solution, when employed in nitrocellulose varnish and ink formulations, yields films which have excellent drying and gloss properties. In fact, drying may be performed by running the product onto which the formulation has been applied at a speed of 150 m/minute. An improvement is also found in pigment-related properties, namely better intensity and better milling efficiency.

(2) A solution consisting of 40 parts of dimethylaminoethanol and 84.2 parts of distilled water is added to 138.4 parts of the product obtained (containing 76% solids). After 15 minutes' mixing, a transparent bluish solution containing 40% solids is obtained. The viscosity of this mixture is high and more than 100 poises.

After dilution with 262.6 parts of distilled water, the solids content now represents only 20% by weight of this solution, giving a solution which has a viscosity of 2 poises and is therefore satisfactory for formulating into varnishes and pigmented coatings.

In conclusion, it may be said that the dilution of the grafted polyethylene prepared in Example 1, on the one hand with ethyl acetate and, on the other hand, with an aqueous medium, to give low values of % solids content, shows that the grafted polyethylene is perfectly capable of being diluted.

EXAMPLE 2

In this example, the procedure described in Example 1 is repeated: the nature and the quantity of the reactants are retained, the only difference lying in the fact that the solvent is now a plasticizer, namely tributoxyethyl phosphate and not ethylglycol. The quantities specified in Example 1 are retained. 242 parts of this solvent are used.

After reaction, a product is obtained which has the appearance of a rubber mass when cold. When hot, on the other hand, this product is fluid; it has an acid value of 54.

This product has excellent qualities for formulating into adhesive and sealant compositions.

EXAMPLE 3

As in Example 2, the procedure followed in Example 1 is repeated: the nature and the quantities of the reactants employed are identical, the only difference lying in the fact that the solvent employed is NP 30 (melting point=40° C.) in a proportion of 242 parts. At the end of the reaction the product is drained off en masse. After cooling, a solid product is obtained whose melting range is 45°–55° C. This product is of particular interest in the field of sealants.

EXAMPLE 4

Into an apparatus identical to that employed in Example 1 are introduced, with stirring, 250 parts of ethylglycol and 40 parts of an oxidized polyethylene with the trade name of A-C Polyethylene 680, marketed by Allied Chemical. Its characteristics are as follows:
weight average molecular weight: 1850
relative density: 0.94
acid value: 16 melting point (in °C.): 110
viscosity at 140° C. (in cP): 250

The temperature is raised to 125° C. As soon a homogeneous phase is obtained, the following charge is introduced continuously into the reactor over 3 hours:
methyl methacrylate: 235
butyl acrylate: 308
methacrylic acid: 53
2,2'-azobisisobutyronitrile: 12

During this addition, the temperature is raised and kept at 130° C.

The temperature is then maintained at 125°–130° C. After 1 h 30 min of reaction, counting from the end of the monomer addition, the reaction is stopped. The product obtained is then diluted with 100 parts of methylglycol. The final product is a transparent and bluish solution which has the following characteristics:
solids content: 65
acid value: 53
content of polyethylene in the solids content (in %): 6.15

The solution containing 65% solids, obtained above, is applied onto kraft paper using a doctor blade. The surface of the film obtained is smooth and glossy and has good resistance to water and to fatty materials.

EXAMPLE 5

In the apparatus and under the operating conditions described in Example 1, there are mixed, first of all:
ethylglycol: 247
A-C Polyethylene 680 (see Ex. 4): 68

Then, as the temperature of the reaction mixture is raised to 130° C., the following charge (in parts by weight) is introduced with stirring:
styrene: 273
butyl acrylate: 333
methacrylic acid: 65
ditert-butyl peroxide: 13
azobisisobutyronitrile: 1

When cold the product obtained is a product of "waxy" appearance which is easy to handle. Its characteristics are as follows:
solids content (in %): 75.5
content of polyethylene in the solids content (in %): 9
acid value: 57

EXAMPLES OF APPLICATIONS OF THE PRODUCT PREPARED IN EXAMPLE 5

(1) Preparation of a varnish

To 100 parts of the product obtained earlier (containing 75.5% solids) are added 14 parts of a solution of urethane alkyd with the trade name Synresin U51 W60, marketed by DSM, at a concentration of 60% in white spirit. A perfectly compatible and stable mixture is obtained, which can be employed in a conventional varnish formulation. After drying, the mixture prepared in this manner exhibits excellent adhesion, hardness and gloss properties. The film also spreads very well.

To 630 parts of the product prepared earlier (75.5% by weight of solids) are added 147 parts of a solution containing 60% by weight of Synresin U51 W60 urethane alkyd in white spirit and 90.5 parts of butyl acetate. The product obtained has a solids content of 65% by weight. When applied with a doctor blade onto paper and dried for 5 minutes air- and after 5 minutes at 80° C., this product yields a dry, glossy and smooth film.

(2) Preparation of a nitrocellulose ink

The following mixture is prepared (in parts):
pigment: phthalocyanine blue: 12.50
dioctyl phthalate: 3.75
½ second nitrocellulose: 8.75
ethyl acetate: 45
product containing 75.5% solids such as prepared in Example 5: 21
Synresin U51 W60 urethane alkyd: 9

After pigment milling, the final product obtained has a solids content of 46.2% by weight. After drying, it yields a smooth and glossy film.

(3) Preparation of a varnish for nitrocellulose-based resins

To 100 parts of the product prepared in Example 5 are added 15 parts of a plasticizer with the trade name Santholite MHP, marketed by Monsanto and 51 parts of ethyl acetate.

A solution containing 50% solids is obtained. A dispersion consisting of the following is then added to 45.75 parts of this solution:
pigment: phthalocyanine blue: 12.50
½ second nitrocellulose: 8.75
ethyl acetate: 33

After mixing, a nitrocellulose ink possessing good gloss and hardness characteristics is obtained.

(4) Preparation of an aqueous solution 270 parts of dimethylaminoethanol and 208 parts of distilled water are added to 930 parts of the product prepared in Example 5.

A stable solution containing 50% solids is obtained. When diluted with distilled water again so as to contain only 20% by weight of solids, a solution of creamy consistency is obtained.

When applied onto paper with a doctor blade, this latter solution yields a glossy film which is resistant to water and to fatty materials.

(5) Preparation of an overprinting varnish for paper

To 139.5 parts of the product prepared in Example 5 are added 40 parts of isopropanol, 40.5 parts of dimethylaminoethanol and 43.2 parts of distilled water. A solution containing 40% solids is obtained. This solution is then diluted with water or a water/alcohol mixture so as to give a viscosity of 20 to 25 seconds in the AFNOR No. 4 cup. This solution is applied with the aid of a flexo or helio machine onto paper, after ink printing. The paper overprinted in this manner has improved water resistance.

EXAMPLE 6

Into an apparatus identical to that of Example 1 are introduced, with stirring, 350 parts of butylglycol and 30 parts of oxidized polyethylene with the trade name ACPolyethylene 392, sold by Allied Chemical. The characteristics of this polyethylene are as follows:
weight average molecular weight: 8000
relative density: 0.99
acid value: 28
softening point (in °C.): 138
viscosity at 140° C. (in cP): 15,000

The temperature of the mixture is raised to 145° C.

As soon as a homogeneous phase is obtained, the following mixture is introduced continuously over approximately 3 hours:
styrene: 240
butyl acrylate: 313
methacrylic acid: 53
ditert-butyl peroxide: 13

During this addition, the temperature of the reaction mixture is maintained at 140°–145° C.

The reaction is then continued for 1 h 30 min at approximately 140°C.

At the end of the reaction, a solution is obtained which is clear when hot and which, when cold, assumes the appearance of a soft gel which can be easily applied with a doctor blade.

The film produced in this manner is highly resistant to moisture and to fatty materials.

EXAMPLE 7

Into an apparatus identical to that employed in Example 1 are introduced 1126 parts of ethylglycol acetate and 344 parts of AC-Polyethylene 629 (employed in Example 1).

The mixture is heated to 130° C. The following mixture is then introduced continuously over approximately 3 hours:
styrene: 908
2-hydroxyethyl methacrylate: 356
butyl acrylate: 908
methacrylic acid: 52
ditert-butyl peroxide: 53

After this addition, the temperature is then maintained at 130°–135° C. for 1 h 30 min, to complete the polymerization.

At the end of the reaction, the product obtained is diluted with 289 parts of ethylglycol acetate.

A solution containing 65% solids is finally obtained, the latter comprising 13% of polyethylene.

When cold, this product has the appearance of a translucent, thixotropic gel.

APPLICATION OF THE SOLUTION CONTAINING 65% SOLIDS, PREPARED ABOVE

Preparation of a paint of high solids content for application to vertical surfaces using, for example, a high-speed disc spray gun The following formulation is prepared (in parts by weight):
product prepared in this example, containing 65% by weight of solids: 100
melamine-formaldehyde mass with the trade name of Cymel 325 and marked by Cyanamid: 16.25
titanium oxide: 65.10
ethylglycol acetate: 1.60

The formulation obtained has a total solids content of 80%. The weight ratio of acrylic to melamine is 80/20.

After application as indicated above and stoving at 120°–130° C. for 15 to 30 minutes, a coating which has the following characteristics is obtained:
film thickness: 25 microns
Persoz hardness: 235–240 seconds
impact strength (1-kg weight): 50 cm
flexibility (Erichsen cup): 8.5 cm
bending (using a conical mandrel): satisfactory for 10-cm diameter
squaring test: no separation

EXAMPLE 9

(Comparative test in the absence of polymerization catalyst)

Into a reactor equipped with a stirring device are introduced 490 parts of ethylglycol and 136 parts of an oxidized polyethylene with trade name A-C Polyethylene 680, marketed by Allied Chemical. Its characteristics are as follows:
weight average molecular weight: 1850
relative density: 0.94
acid value: 16
softening point (°C.): 110
viscosity at 140° C. (cP): 250

The temperature is then raised to 125° C. and the reaction mixture is left stirred for 15 minutes. A dispersion is obtained. The following mixture is then introduced continuously into the dispersion over 3 hours:
styrene: 545
butyl acrylate: 665
methacrylic acid: 131

The temperature is kept at 125°–135° C. during the introduction of the monomer mixture.

The reaction is then allowed to continue for 1 h 30 min.

At the end of the reaction, the product obtained is drained off en masse; it has the appearance of a white opaque wax and has the following characteristics:
quantity of polythyelene in the solids (in %): 9.2
solids content (in %): 75
acid value: 57

Attempt to prepare an aqueous solution 260 parts of distilled water and 15 parts of dimethylaminoethanol are added to 100 parts of the wax obtained in this example, and this mixture is then heated to 40° C. It is impossible to obtain a homogeneous mixture.

After cooling, the mixture separates into two parts: a white mass and a clear aqueous phase.

EXAMPLE 9

(Comparative test)

Example 9 is identical to Example 8, except that 2 parts of 2,2'-azobis(isobutyronitrile) are introduced into the mixture consisting of ethylglycol and of oxidized polyethylene.

At the end of the reaction, the product obtained has the appearance of a translucent whitish wax.

When mixed with distilled water and with dimethylaminoethanol under the conditions described in Example 8, this wax does not yield a homogeneous mixture. After evaporation, a crystalline and hydroscopic soft wax is obtained.

EXAMPLE 10

The conditions and the products employed in this example are identical to those in Example 8, except that:
the mixture consisting of ethylglycol and of oxidized polyethylene also contains 2 parts of 2,2'-azobis(isobutyronitrile),
the monomer mixture also contains 26.8 parts of ditert-butyl peroxide (i.e. 2% of the monomer mixture).

At the end of the reaction, a translucent soft wax is obtained.

A repetition of the attempt to prepare an aqueous solution, such as described in Example 8, using this wax, makes it possible to produce a whitish and translucent homogeneous solution which has the following characteristics:
solids content (in %): 20
pH: 9.5

This product can be diluted completely with water.

EXAMPLE 11

The procedure followed in this example and the nature and the quantities of the chemical products employed in this example are identical to those in Example 10, except for the nature of the oxidized polyethylene chosen which, in this example, is a soft wax with the trade name of COPOLA, marketed by CdF Chimie and whose charcteristics are as follows:
weight average molecular weight: 2600
crystallinity (in %): 10
viscosity at 140° C. (in poises): 0.6
melting temperature (in °C.): 90–97
At the end of the reaction, a product with the following characteristics is obtained:
appearance: viscous, transparent and capable of being applied with a doctor blade solids content (in %): 75 yields smooth and very glossy films.

Preparation of an aqueous solution

To 100 parts of this wax are added 15 parts of dimethylaminoethanol and 85 parts of distilled water.

A homogeneous solution containing 50% solids is obtained. This solution can be diluted with water.

Dilution tests (1) and (2)

1. 34.3 parts of distilled water are added to 80 parts of the solution containing 50% solids. A smooth and whitish creamy solution which can be applied with a doctor blade is obtained.
2. 17.3 parts of distilled water and 17 parts of isopropanol are added to 80 parts of the solution containing 50% solids. A translucent solution containing 35% solids and with a viscosity of 7200 cP is obtained.

We claim:

1. A thermoplastic or thermosetting resin, soluble in organic solvents and/or aqueous media, consisting essentially of grafted polyethylene obtained by:
    (a) dispersing at least one oxidized polyethylene in the form of powder or granules in at least one organic solvent which has a boiling point above the softening range of said oxidized polyethylene, said oxidized polyethylene being employed in a proportion of 0.5 to 30% by weight based on the resin prepared and having a weight average molecular weight of between 900 and 25,000 and containing side groups ending in functional groups comprising hydroxyl, ketone, carboxyl and/or ester groups,
    (b) heating, with stirring, the dispersion obtained by step (a) to a temperature above the softening temperature of said oxidized polyethylene, and
    (c) gradually adding a mixture of catalyzed monomers consisting essentially of acrylic and/or methacrylic monomers in a proportion of 70 to 99.5% by weight based on the resin prepared, to the homogeneous phase of solvent and molten oxidized polyethylene, until the resin is obtained.

2. A resin according to claim 1, wherein said oxidized polyethylene is an emulsifiable oxidized polyethylene having a weight average molecular weight of between 1,200 and 8,000.

3. A resin according to claim 1, wherein the reaction temperature in stages (b) and (c) is 5° to 15° C. higher than the softening temperature of said oxidized polyethylene.

4. A resin according to claim 1, wherein from 1 to 4% by weight of catalyst is used, based on the weight of the monomers.

5. A binder for coatings, said binder comprising a dispersion of thermoplastic or thermosetting resin, soluble in organic solvents and/or aqueous media, said resin consists essentially of grafted polyethylene obtained from:
    0.5 to 30% by weight of oxidized polyethylene, based on said resin, said oxidized polyethylene having a weight average molecular weight of between 900 and 25,000 and containing side groups ending in functional groups comprising hydroxyl, ketone, carboxyl and/or ester groups, and
    70 to 99.5% by weight of monomers consisting essentially of acrylic and/or methacrylic monomers.

6. A binder according to claim 5, wherein said oxidized polyethylene is an emulsifiable oxidized polyethylene having a weight average molecular weight of between 1,200 and 8,000.

7. A binder according to claim 5, wherein said binder consists essentially of a solution containing 20 to 60% by weight of said resin and has a viscosity of 1 to 50 poises at ambient temperature.

8. A binder according to claim 5, wherein said binder consists essentially of a solution of said resin obtained from 15 to 30% by weight of said oxidized polyethylene in relation to said resin and a solvent having a low vapor pressure at the reaction temperature used to form said resin.

9. A binder for coatings said binder consisting essentially of a solution of thermoplastic or thermosetting resin as defined in claim 1.

10. A resin according to claim 2, wherein the reaction temperature in stages (b) and (c) is 5° to 15° C. higher than the softening temperature of said oxidized polyethylene.

11. A resin according to claim 2, wherein from 1 to 4% by weight of catalyst is used, based on the weight of the monomers.

12. A resin according to claim 3, wherein from 1 to 4% by weight of catalyst is used, based on the weight of the monomers.

13. A binder according to claim 6, wherein said binder consists essentially of a solution containing 20 to 60% by weight of said resin and has a viscosity of 1 to 50 poises at ambient temperature.

14. A binder according to claim 6, wherein said binder consists essentially of a solution of said resin obtained from 15–30% by weight of said oxidized polyethylene in relation to said resin and a solvent having a low vapor pressure at the reaction temperature.

15. A binder for coatings, said binder consisting essentially of a solution of thermoplastic of thermosetting resin as defined in claim 2.

16. A binder for coatings, said binder consisting essentially of a solution of thermoplastic of thermosetting resin as defined in claim 3.

17. A binder for coatings, said binder consisting essentially of a solution of thermplastic of thermosetting resin as defined in claim 4.

18. A binder for coatings, said binder consisting essentially of a solution of thermoplastic of thermosetting resin as defined in claim 10.

19. A binder for coatings, said binder consisting essentially of a solution of thermoplastic of thermosetting resin as defined in claim 11.

20. A binder for coatings, said binder consisting essentially of a solution of thermoplastic of thermosetting resin as defined in claim 12.

21. A resin according to claim 1, wherein said monomers include ethylenic monomers other than acrylic and/or methacrylic monomers.

22. A binder according to claim 5, wherein said monomers include ethylenic monomers other than acrylic and/or methacrylic monomers.

23. A resin according to claim 1, wherein during step (c), a constant temperature is maintained.

24. A resin according to claim 1, wherein addition of said mixture during step (c) is performed over a period of 1–4 hours.

25. A process for the production of a thermoplastic or thermosetting resin comprising:
   (a) dispersing at least one oxidized polyethylene in the form of powder or granules in at least one organic solvent having a boiling point above the softening range of said oxidized polyethylene, said oxidized polyethylene being employed in a proportion of 0.5 to 30% by weight based on the resin prepared and having a weight average molecular weight of between 900 and 25,000 and containing side groups ending in functional groups comprising hydroxyl, ketone, carboxyl and/or ester groups,
   (b) heating, with stirring, the dispersion obtained by step (a) to a temperature above the softening temperature of said oxidized polyethylene, and
   (c) gradually adding a mixture of a catalyzed monomers consisting essentially of acrylic and/or methacrylic monomers in a proportion of 70 to 99.5% by weight based on the resin prepared, to the homogeneous phase of solvent and molten oxidized polyethylene, until the resin is obtained.

26. A process according to claim 25, wherein said oxidized polyethylene is an emulsifiable oxidized polyethylene having a weight average molecular weight of between 1,200 and 8,000.

27. A process according to claim 25, wherein the reaction temperature in stages (b) and (c) is 5° to 15° C. higher than the softening temperature of said oxidized polyethylene.

28. A process according to claim 25, wherein from 1 to 4% by weight of catalyst is used, based on the weight of the monomers.

29. A process according to claim 25, wherein said monomers include ethylenic monomers other than acrylic and/or methacrylic monomers.

30. A process according to claim 25, wherein addition of said mixture during step (c) is performed over a period of 1–4 hours.

* * * * *